Patented Jan. 23, 1940

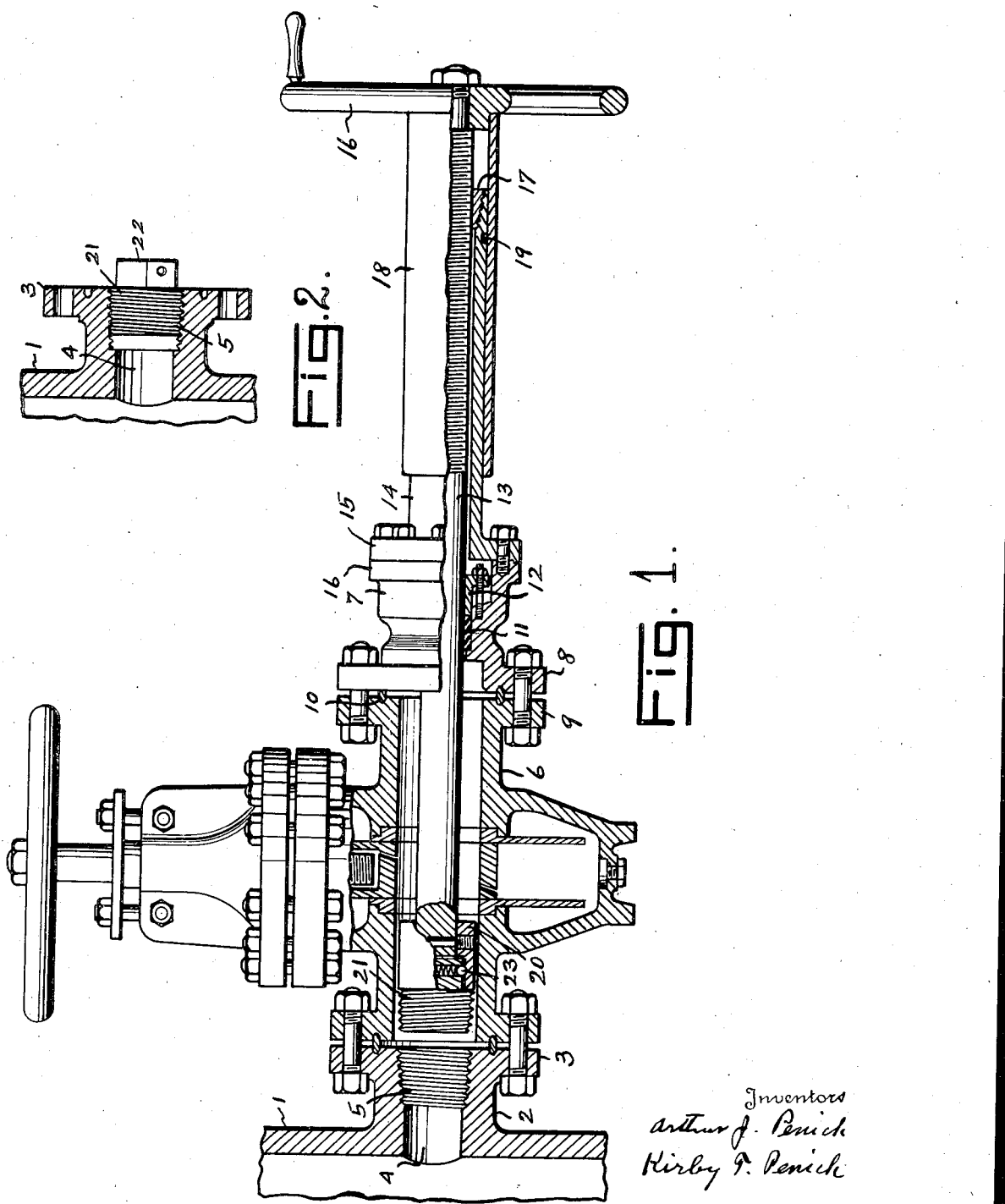

2,187,838

UNITED STATES PATENT OFFICE 2,187,838

VALVE REMOVING TOOL

Arthur J. Penick and Kirby T. Penick, Houston, Tex.

Application March 7, 1938, Serial No. 194,373

2 Claims. (Cl. 29—84)

This invention relates to a valve removing tool.

It is an object of the invention to provide a tool of the character described specially designed for use in removing valves from high pressure lines for repairs or replacements without interfering with the flow of fluid through the line.

It has been specially designed for the purpose of removing valves from well head equipment in case the valve to be removed should develop a leak or become otherwise defective.

Another object of the invention is to provide a tool of the character described which may be readily attached to the equipment and whereby the defective valve may be readily removed and repaired or replaced and the tool then readily detached upon completion of the repairs.

It is a further object of the invention to provide a tool of the character described that is of simple and durable construction and which may be cheaply produced and is not liable to get out of repair.

With the above and other objects in view the invention has particular relation to certain novel features of construction, operation and arrangement of parts, an example of which is given in this specification and illustrated in the accompanying drawing, wherein:

Figure 1 shows a side view of the tool partly in section as applied to the valve of a well head and shown in position for screwing the closure plug in place in the valve connection of the well head, and Figure 2 shows a fragmentary sectional view of the well head, showing the plug screwed home and the well head valve removed.

Referring now more particularly to the drawing wherein like numerals of reference designate the same parts in each of the figures, the numeral 1 designates a well head having the tubular valve connection 2 extending out laterally therefrom and provided with an external annular flange 3 at its outer end and with a fluid passageway 4 through the connection whose outer end has the tapering internal threads 5. Bolted to the flange 3 there is shown the gate valve 6 for controlling the flow of liquid outwardly through a flow line which is normally connected to the outer end of the valve but which is not shown in the present illustration. In use the valve 6 sometimes develops a leak or becomes otherwise defective and it is desirable to remove the same for repairs and replacement. In such case the flow line is disconnected from the outer end of the valve and the tool hereinafter described is attached to the outer end of the valve casing as illustrated in Figure 1. This tool will now be described:

The numeral 7 designates a tubular box having an outwardly extended flange 8 at one end adapted to be bolted to a similar flange 9 on the outer end of the valve casing 6 with a seal ring 10 between said flanges. This box has an inside annular packing 11 which may be secured in place by the inside gland 12 which is bolted to the box as shown. Said packing and gland form a stuffing box which surrounds the stem 13 of the tool.

There is a tubular stem housing 14 whose inner end is formed with an external flange 15 which coincides with and is bolted to the outer end 16 of the box 7. The stem 13 works axially through said housing 14 and the outer end of the stem is externally threaded and has a hand wheel 16 attached to the extreme outer end thereof.

Screwed into the outer end of the housing 14 and having a threaded connection with the stem 13 there is a replaceable nut 17 which may be readily replaced when its threads become worn.

Attached to the hand wheel 16 and fitted closely over the housing 14 there is a tubular shield 18 and countersunk into the housing, near its outer end, there are annular packing 19 which forms a seal with the shield 18. The inner end of the stem 13 extends beyond the housing 14 and through the stuffing box of the box 7 and has a removable socket wrench 20 thereon.

There is an externally threaded plug 21 having an outer end projection 22, polygonal in form, and adapted to be screwed into the threads 5 to close the passageway 4. The wrench 20 is shaped to fit over the extension 22 when it is desired to screw the plug in place to close said passageway or to remove it.

Should it become necessary to repair or replace the valve 6, the flow of fluid from the well may be diverted through another line of the Christmas tree or well head connection and the valve 6 then closed and the flow line disconnected from the outer end of the valve and the valve removing tool may be then bolted to the flange 9 as shown. The stem 13 may then be turned until the plug 21 is screwed into the connection 2 as illustrated in Figure 2. This plug is detachably maintained in connection with the wrench 20 by the releasable ball clutch 23 of conventional construction and when the plug 21 is screwed in place, the valve may be unbolted from the flange 3 and removed, the wrench being detached from the plug at the same time.

When the repairs have been made or a new valve is to be installed said valve may be bolted to the flange 3. The stem 13 of the tool should then be screwed out until it is fully extended, and the stem then inserted through the valve, which, at that time, is open, until the wrench 20 is applied to the extension 22 of the plug and the flange 8 of the tool should then be bolted to the flange 9 of the valve. The plug 21 may now be unscrewed by turning to the left and when unscrewed may be moved out to the outer end of the casing of the valve 6. Said valve may then be closed and the tool detached from the outer end thereof and removed and the usual flow connection bolted to the flange 9 of the valve and the valve may then be opened and normal production resumed.

The drawing and description disclose what is now considered to be a preferred form of the invention by way of illustration only while the broad principle of the invention will be defined by the appended claims.

What we claim is:

1. A tool comprising a tubular box, attaching means on one end of the box, a tubular housing extended from the other end of the box, an operating stem extending through the housing and box, sealing means between the stem and box, means forming a threaded connection between the outer end of the housing and stem, means on one end of the stem for rotating the stem, a tubular shield on said rotating means having a telescoping connection with the housing, means forming a seal between the shield and housing and a wrench on the other end of the stem.

2. A tool comprising a tubular box member, attaching means on one end of said member, a tubular housing attached to, and extending from, the other end of the box member, an operating stem extending through the housing and box member, means forming a threaded connection between the housing and stem, means on one end of the stem for rotating the stem, a tubular shield on said rotating means having a telescoping connection with the housing, means forming a seal between the shield and the housing and a wrench on the other end of the stem.

ARTHUR J. PENICK.
KIRBY T. PENICK.